United States Patent

Goodale

[15] 3,654,628

[45] Apr. 4, 1972

[54] MULTI-TRACK STORAGE SYSTEM HAVING A TOUCH CIRCUIT WITH INDIVIDUAL HEAD INDICATION

[72] Inventor: Donald M. Goodale, Thousand Oaks, Calif.

[73] Assignee: Burroughs Corporation, Detroit, Mich.

[22] Filed: May 4, 1970

[21] Appl. No.: 34,366

[52] U.S. Cl. ............340/174.1 B, 340/174.1 E, 179/100.2 B

[51] Int. Cl. ..........................................................G11b 5/40

[58] Field of Search............................340/174.1 B, 174.1 E; 179/100.2 B, 100.2 P

[56] References Cited

UNITED STATES PATENTS

| | | | |
|---|---|---|---|
| 3,401,383 | 9/1968 | Ault | 340/174.1 B |
| 3,290,666 | 12/1966 | Crew | 340/174.1 B |
| 3,329,943 | 7/1967 | Tanguy, Jr. et al. | 340/174.1 B |
| 3,531,789 | 9/1970 | Halfhill et al. | 340/174.1 B |

*Primary Examiner*—Stanley M. Urynowicz, Jr.
*Attorney*—Christie, Parker & Hale

[57] ABSTRACT

A touch indicator circuit generates and stores a warning signal in response to an offending contact between any one of a plurality of head assemblies and a movable record member. A circuit matrix responsive to signals generated upon a touching provides encoded warning signals which uniquely identify the particular head assembly which has made contact.

24 Claims, 3 Drawing Figures

INVENTOR.
DONALD M. GOODALE
BY
Christie, Parker & Hale
ATTORNEYS

MULTI-TRACK STORAGE SYSTEM HAVING A TOUCH CIRCUIT WITH INDIVIDUAL HEAD INDICATION

BACKGROUND OF THE INVENTION

1. Field of the Invention

This invention relates to storage systems having moving record members with multiple storage tracks and, more particularly, to such a storage system having an alarm system for generating a warning signal when one of a plurality of head assemblies for reading and writing on the record member makes contact with the record member and for generating coded signals for identifying the individual head assembly which has made contact.

2. Description of Prior Art

Drums and disks, etc. having magnetic recording surfaces are frequently used for the storage of signals. Electromagnetic transducers, commonly called heads, are commonly floated on a thin film of air adjacent the moving record surface and are used for writing on and reading from the magnetic recording surface as it moves relative to the head. State of the art machines frequently float the heads very close to the moving recording surface. Stating it differently, the head to recording surface spacing provides an extremely small dielectric gap. This is done in order to produce good signal resolution and low noise during writing or reading. The smaller the gap, the more likely it is that the head will make contact with the magnetic surface because of instability in the floating heads, vibration of the moving recording surface, or other mechanical imperfections in the recording machine structure. Dust particles also wedge in between the heads and the recording surface thereby causing malfunctions. As a result it is necessary to have means for detecting such offending contacts and for generating an alarm to notify operating personnel, to cause the heads to be retracted as quickly as possible before further damage is done and to stop further reading and writing until the situation is corrected. A prior art system for effecting touch detection is described in Tanguy et al., U.S. Pat. No. 3,329,943, entitled HEAD TO DISK SEPARATION DETECTOR, which issued on July 4, 1969, and is assigned to the same assignee as the present invention. The system described in the referenced patent incorporates a magnetic record member, such as a disk, and a magnetic transducer member each having an electrically conductive surface. Various electronic touch indicator circuits are described, each of which can generate an alarm signal in response to offending head/disk contacts. In each such touch indicator circuit the input stage is a transistor. A voltage source supplies bias current to the input transistor. The base-emitter junction of the input transistor defines a voltage drop which cooperates with other circuit elements in establishing a potential across the disk/head gap. Since the dielectric gap is so small extremely high voltage gradients exist across the gap. For example, a gap potential of 1.5 volts causes a voltage gradient of 15,000 volts per inch at a typical gap of 100 micro-inches. As the gap narrows this voltage gradient increases geometrically until arcing occurs. As current is drawn between the electrically conductive surfaces the voltage level at the base terminal of the input transistor changes. The transistor amplifies this voltage change and thereby provides an indication that an electrical contact has been established between the two surfaces.

An improvement on the touch indicator circuits disclosed in the referenced patent is described in a copending application entitled STORAGE SYSTEM HAVING A HEAD ASSEMBLY FOR READING AND WRITING ON A RECORD MEMBER HAVING A TOUCH INDICATOR CIRCUIT by John B. Houston, bearing U.S. Ser. No. 1,734 , filed Jan. 9, 1970 , and assigned to the same assignee as the present invention. The touch circuit described therein employs a differential input comparator stage for detecting whether electrical contact has been made between the two conductive surfaces. The differential input comparator stage compares a reference potential with a potential applied between the conductive surfaces of the record member and head and forms an output signal when there is a change in potential between the conductive surfaces, thereby indicating a touch.

State of the art disk file systems use a large number of recording tracks on each disk face. Typically, a head is provided for reading and writing for each track on the disk face. Previous touch indicator systems did not have capability for identifying the individual head within the group of heads associated with a disk face which had made contact. If any one of the heads made contact with the disk face, the touch detector system would generate a warning signal. However, there was no provision for uniquely identifying the individual offending head. Without specific information to identify the offending head, maintenance personnel did not know which head to repair.

SUMMARY OF THE INVENTION

Briefly, an embodiment of the present invention is in a magnetic storage system having a multi-track magnetic record member with an electrically conductive surface and a plurality of associated magnetic transducer assemblies. Each magnetic transducer assembly has an electrically conductive contact called a probe on the surface of the assembly adjacent to the record surface. In the event of an equipment failure which causes a head assembly to move to close to the record surface an electrical contact is established between probe and face. A plurality of touch detector circuits are provided which can detect such electrical contacts and in response produce signals which can be used for various purposes. For example, the signal can be used to cause the transducer assemblies to be retracted or used by the system to take appropriate action with respect to any erroneous data which may have been read or to warn maintenance personnel of the equipment failure. The improvement of the present invention resides in the use of gating means for coupling the touch detector circuits to the probes which makes it possible to use fewer touch detector circuits than probes and yet still uniquely identify which individual head has made contact with the record face.

The invention contemplates the classification of the plurality or set of probes as elements of exhaustive, at least partially disjoint subsets. By exhaustive is meant that each probe is included as an element of at least one subset of probes. Stating it differently, the logical union of these subsets exhausts the elements of the set of probes. By at least partially disjoint is meant that the subsets are unique in that no two subsets contain exactly the same group of probes. Each touch detector is coupled to all of the probes in one of the unique subsets of probes. By virtue of such coupling, a specific subset of the plurality of touch detectors is actuated whenever a specific probe makes contact with the record member. Therefore, a touch indication is produced which uniquely identifies the specific offending head.

In one embodiment of the present invention the probes and touch detectors are coupled according to the following classification of the probes. The plurality of probes are classified by groups called zones and subgroups called heads. Similarly, the touch detectors are classified into associated groups called zone detectors and subgroups called head detectors. Each zone detector is coupled to all of the probes in one zone but is not coupled to the probes in any other zone. Each head detector is coupled to one and only one probe in each zone of probes.

In magnetic disk file systems the record members usually have two magnetic surfaces and a plurality of transducer members associated with each face of the disk. When combined with such a system, an embodiment of the present invention could employ a third plurality of touch detector circuits for providing a signal indicating which face of the disk has made contact with a touch probe.

The invention is of considerable importance because of the savings in equipment required to accomplish the goal of identifying the individual head which made contact with the record member. For example, an embodiment of the present invention in a disk file system having 196 probes for each disk requires only 18 touch detector circuits to point to the individual offending head.

DETAILED DESCRIPTION OF A SPECIFIC EMBODIMENT

Figure 1:
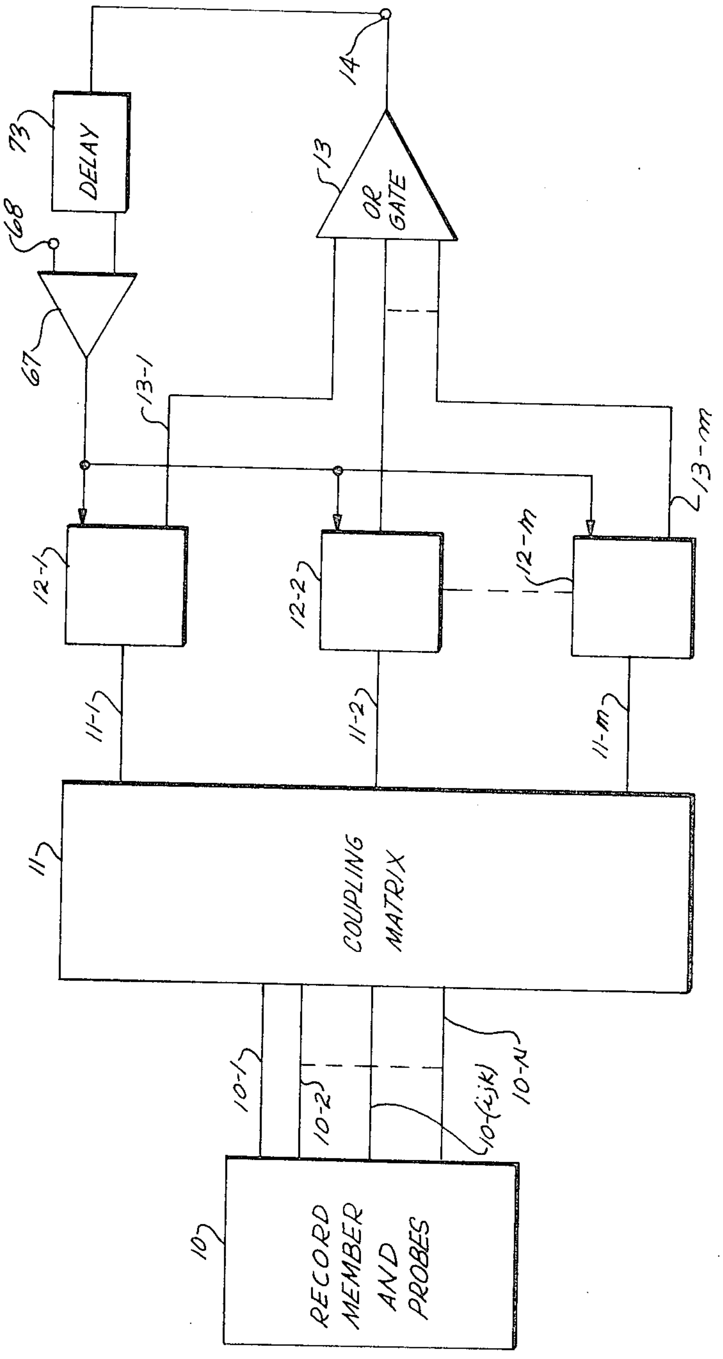
FIG. 1 is a block diagram of a storage system embodying the present invention.

In FIG. 1 a magnetic storage member having an electrically conductive surface and associated head assemblies are represented by block 10. The storage device could be a drum, disk, tape or the like. Line 10–1 through 10–N represent wires connected to electrically conductive surfaces called probes which are on the head assemblies adjacent the record member within block 10. In the event of an electrical contact between a probe and the storage member a signal is developed on one of these wires in the form of a change in potential. For simplicity, the circuitry required for this purpose is not shown in FIG. 1. Wires 10–1 through 10–N interconnect block 10 with coupling matrix 11. Circuits not shown in FIG. 1 within coupling matrix 11 respond to a signal on one of these wires to produce one or more signals on lines 11–1 through 11–M which connect couplings matrix 11 to touch detector circuits 12–1 through 12–M respectively. Touch detector circuits are actuated by the signals coupled from the coupling matrix to produce other signals on lines 13–1 through 13–M which define a parallel code which identifies the particular offending head. OR gate 13 is coupled to all of the touch detector circuits 12 via lines 13–1 through 13–M so as to combine the coded signals into one warning signal produced on terminal 14 which indicates that at least one head has made contact with the record member. To be explained in more detail the OR gate 13 is serially coupled through a delay circuit 73 and an AND gate 67 to each of the touch detector circuits 12 to latch up the particular touch detector circuit which has detected a head that was touched.

Figure 2:
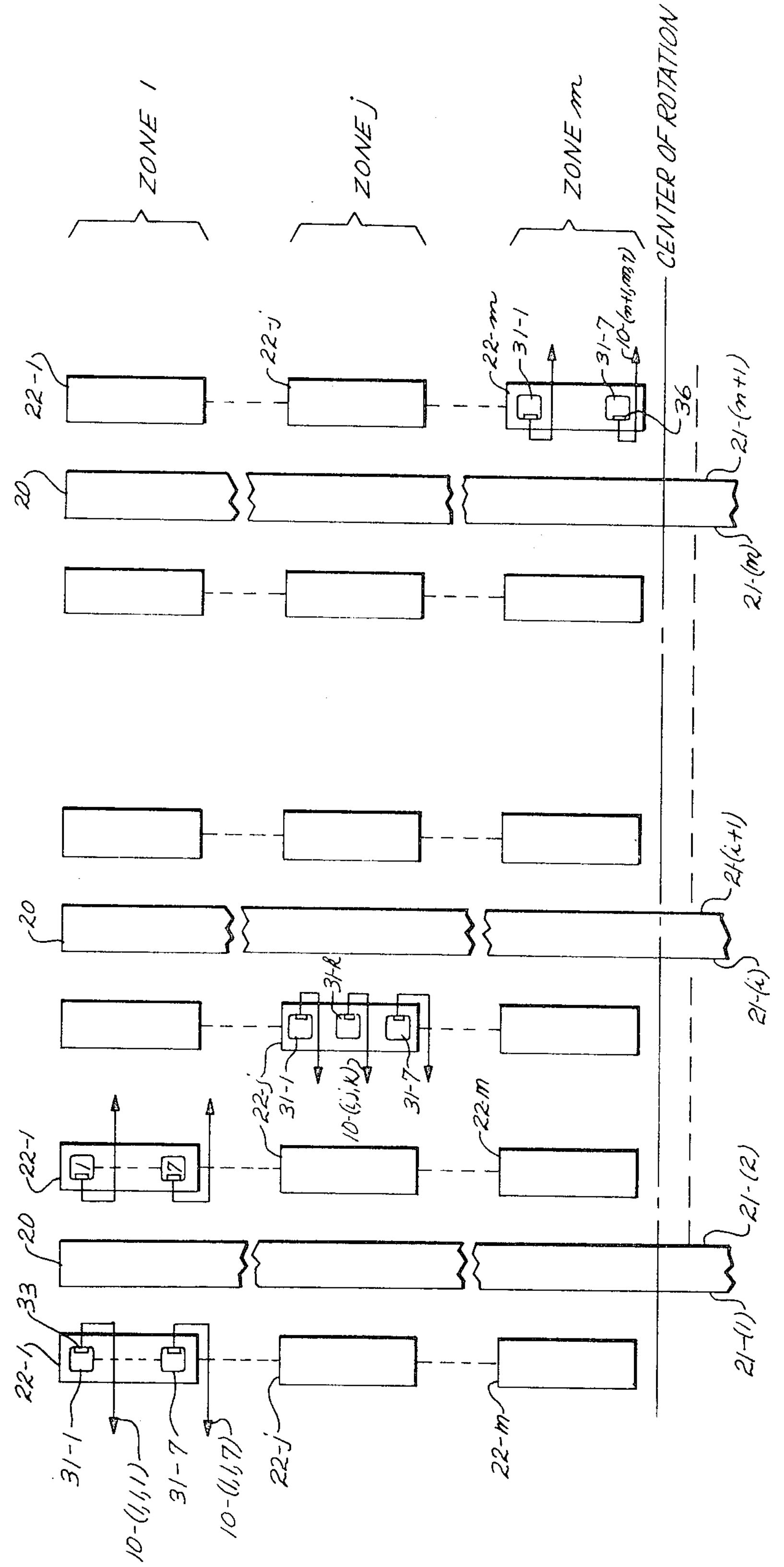
FIG. 2 is a diagrammatic drawing of the disks and head assemblies of a multi-disk file system having head assemblies grouped by face, zone and head.

FIG. 2 shows in more detail the elements of a multi-disk storage device which may be contained in block 10 of FIG. 1. Disks 20, disk surfaces 21, heads 31 and imaginary head groupings 22 are shown by way of example. Only three disks are shown by way of example, the rest being indicated by dashed lines. Side views are shown of each disk and broken lines are used to indicate that each disk is actually much larger than shown. Each disk has two magnetic recording surfaces 21 which are also electrically conductive. The recording surface of each disk is uniquely identified by a numeral or letter following the number 21, i.e. 21–(1), 21–(2), **21–(*i*), 21–(*i*+1), 21–(*n*) and 21–(*n*+1). Thus there are 1** through n+1 disk surfaces on one-half of *n*+1 disks. The head blocks 22 each include seven heads or reading and writing transducers 31. The seven heads in each block are identified by the numerals 31–1 through 31– 7. The general case of a head in a block is shown with respect to disk face **21–(*i*) and is identified as 31–*k***.

The imaginary head groupings or blocks 22 each define an annular zone or recording area on the corresponding disk surface as the disk surface rotates about its center of rotation. Zones on each of the disk surfaces at the radial position are identified as the same zone. Thus there are zones 1 through *m*, only zones 1, *j*, and *m* being shown by way of example. The blocks of heads for each zone are identified by the same numeral as the zone, Thus head blocks 22–1, **22–*j* and 22–*m*** have the same numeral as zones 1, *j* and *m*.

Each head assembly 31 has an electrical contact or probe 33 on its surface adjacent to the disk with which it is associated. Each probe is connected to a wire 10 to couple the probe to coupling matrix 11 of FIG. 1. The reference numerals identifying the wires use the numeral 10 followed by three numbers or letters which in their order of occurrence identify the disk surface adjacent the corresponding head, the zone in which the corresponding head lies and the number of the head in the head bock. As examples, on the surface of the head 31-1 at the upper left-hand corner of FIG. 2 there is shown probe 33 which is connected to wire 10–(1,1,1) and at the opposite corner is shown probe 36 which is connected to wire **10–(*n*+1,*m*,7). Where the context permits, a simplified expression will be used to designate these wires. As examples, wire 10–(1,1,1 will be designated 10–1 and wire 10–(*n*+1,*m*,7) will be designated 10–196. A signal developed at the probe incident to an electrical contact with surface 21–1 is coupled by wire 10–(1,1,1) to coupling matrix 11** for distribution to the touch detector circuits of FIG. 1.

Figure 3:
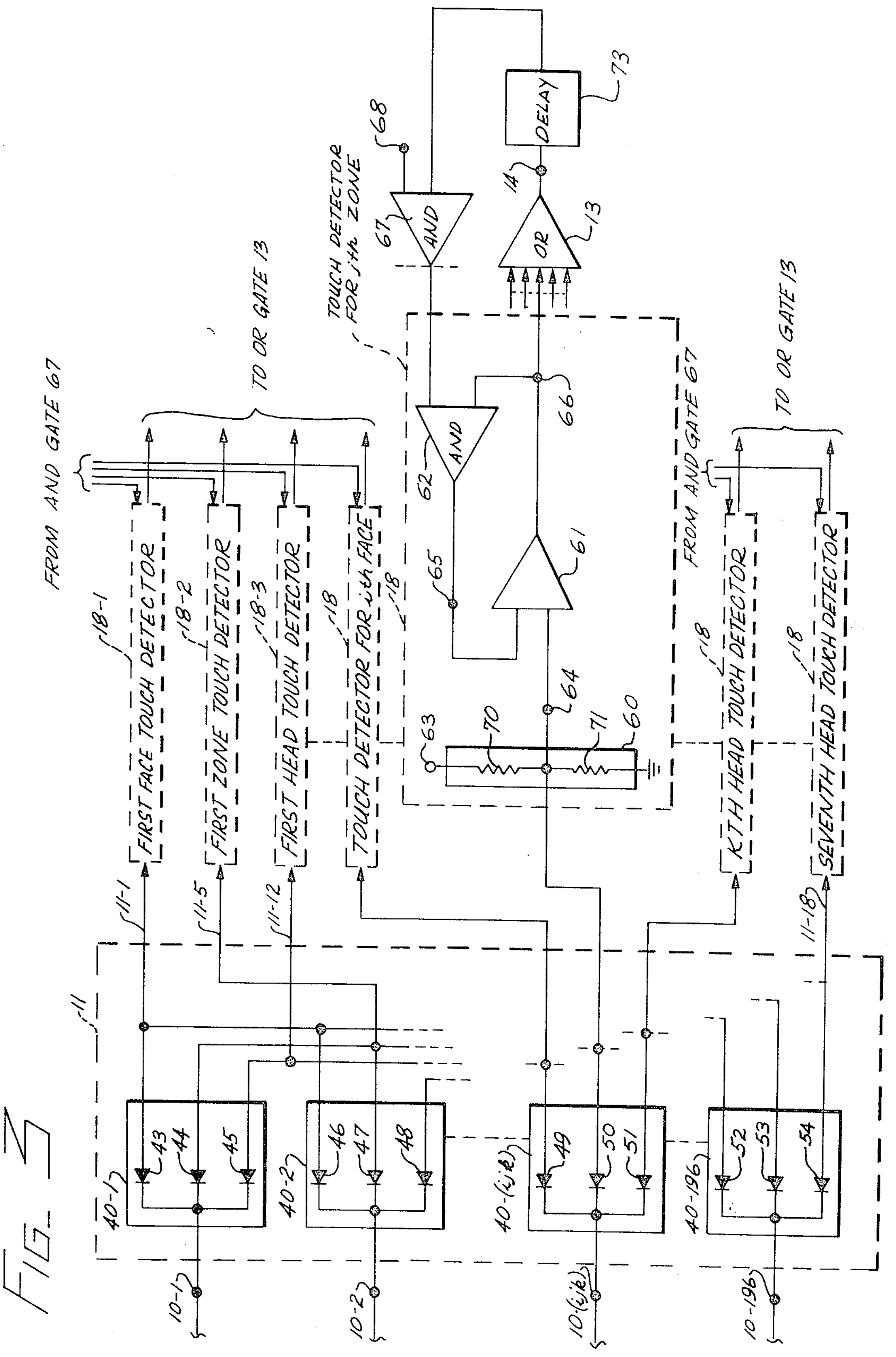
FIG. 3 is a schematic, partially in block diagram form, of a specific example of the storage system of FIG. 1 and embodying the present invention.

Reference is now made to FIG. 3 for the details of a specific embodiment of a coupling matrix which could be represented by coupling matrix 11 of FIG. 1. For purposes of explanation it is assumed that the coupling matrix couples 196 probes from four disk surfaces to 18 touch detector circuits i.e., 18–1 through 18–18). Because of the large number of probes only four representative probes are specifically considered and represented in FIG. 3.

The probes are grouped into four faces, seven zones and seven heads in each zone. Thus each zone consists of seven heads, and there are seven zones on each face.

Wires 10–1, 10–2 . . . **10–(*ijk*) and 10–196 couple the 196 probes from block 10 to coupling matrix 11. Wires 11–1 through 11–18 couple the 18 touch detectors to coupling matrix 11. Wires 11–1 through 11–4** are individually coupled to four face touch detectors (only the touch detector for the 1st and *i*th face are shown); wires 11–5 through 11–11 are individually coupled to seven zone touch detectors (only the touch detectors for the 1st and *j*th zone are shown); wire 11–12 through 11–18 are individually coupled to seven head touch detectors (only the touch detectors for the 1st, kth and seventh head are shown). Diode gates 40–1 through 40–196 each define an input node for coupling to a probe within block 10. Each diode gate comprises three diodes with the cathode ends of the diodes coupled to a common node which in turn is coupled to one of the 196 terminals. In the preferred embodiment the diodes are of the germanium type because such diodes exhibit a lower potential drop during forward biased conditions than do diodes of the silicon type. Each diode gate defines a branch for distributing the signals produced at a probe to three different touch detector circuits. One of these three touch detector circuits is for indicating a face, a second is for indicating a zone, and a third is for indicating a head within a zone. For example, diodes 43, 44 and 45 have their cathodes coupled together to terminal 10–1. The anode of diode 43 is coupled by means of wire 11–1 to a touch detector associated with the first face; the anode of diode 44 is coupled by means of wire 11–5 to a touch detector associated with the first zone; the anode of diode 45 is coupled by wire 11–12 to a touch detector associated with the first head. The anode of diode 43 is also coupled to the anode of one of the diodes in every diode gate coupled to the touch detector for the first face. In FIG. 3 a line is shown connecting the anode of diode 43 to the anode of diode 46 and a dotted line suggests the connection to a plurality of other diodes. As an example of the general case, consider diode gate **40–(*ijk*). All three cathodes of diodes 49, 50, 51 couple to terminal 10–(*ijk*) to effect a connection with the ijkth probe within block 10. The anode of diode 49 is coupled to all of the other diodes associated with the ith face and to the touch detector for the ith face. The anode of diode 51 is coupled to all of the other diodes associated with the kth head and to the touch detector for the kth head. The anode of diode 50 is coupled to all of the other diodes associated with the jth zone, to the touch detector for the jth zone. The touch detector for the jth zone is shown in dashed lines by way of example and the other touch detectors are identical. The diode 50 is connected to comparator 61 and to bias circuit 60 associated therewith which are part of the touch detector circuit. Comparator 61 is a differential input amplifier. For example, it could be a $\mu$ A710 comparator circuit manufactured by the Semiconductor Division of Fairchild Camera and Instruments Corp. among others. The output voltage level at terminal 66 of comparator 61 depends upon the relative levels of its inputs on terminals 64 and 65. If the voltage level established by bias circuit 60 which is coupled to terminal 64 is higher than the level established at terminal 65, then the comparator output level at terminal 66 is low. On the other hand, if the voltage level at terminal 64 is the lower level of the two inputs then the output at terminal 66 is a high level. A voltage source not shown connects to terminal 63 which is connected to resistor 70 within bias circuit 60. Another resistor within bias circuit 60, resistor 71** connects to ground (0 volt potential).

Since all of the touch detector circuits operate in a similar manner, only the operation of a typical touch detector will be described. During normal operation of the storage system, the disks rotate relative to the head assemblies. Each head assembly floats on a thin film of air created by the rotating disk. A voltage gradient is established across the gap between the probe connected to wire 10–(*ijk*) and disk surface 21–*i* by virtue of the circuit loop formed by a voltage source connected to terminal 63, bias circuit 60, diode 50 and the ground applied to disk surface 21–*i*. The anode of diode 50 is coupled to all of the other diodes associated with the jth zone. When the probe connected to wire 10–(*ijk*) moves so close to disk surface 21–*i* that electrical conduction is established between their two electrically conductive surfaces, current will flow out of bias circuit 60 and through diode 50. The voltage level at terminal 64 will drop when the voltage level drops below the level established at terminal 65; the output of comparator 61 changes from a low level to a high level. The output of comparator 61 couples to AND gate 62 and to OR gate 13. OR gate 13 is also coupled to all of the other 17 comparator circuits. Therefore, OR gate 13 can generate a warning signal when any one of the 18 comparator circuits indicates that a touch has occurred. Delay circuit 73 could comprise a resistor-capacitor delay network and a threshold circuit. There are many threshold circuits known to those skilled in the art. For example, a Schmitt trigger circuit exhibits a characteristic that its output is at one level when its input is below a given threshold and its output is at a different level when its input is above the given threshold. If electrical conduction is maintained for a time longer than the time constant of delay circuit 73, the output of delay circuit 73 will change from a low level to a high level. The output of delay circuit 73 couples to one of two inputs of AND gate 67. The other input to AND gate 67 is connected to terminal 68 to receive therefrom a manual reset. The manual reset is a normally high signal. After the output of delay circuit 63 assumes a high level, both inputs to AND gate 67 will be high and therefore the output of AND gate 67 will go high. The output of AND gate 67 is fed back to each of the 18 touch detector circuits. As an example of the feedback coupling, AND gate 67 is shown coupled to AND gate 62 within the touch detector for the jth zone. When AND gate 67 impresses a high level on its second input, AND gate 62 will in turn impress a high level on terminal 65 input to comparator 61. This high level is higher than the normal bias level established at terminal 64. Therefore, even if electrical conduction between probe and disk ceases the output of comparator 61 remains high. The circuit is thus latched up.

By a similar mode of operation the face touch detector circuit for the ith face which is coupled to diode 49 and the head touch detector for the kth head which is coupled to diode 51 will also latch up. Maintenance personnel can examine the status of the touch detector circuits and determine that the probe connected to wire 10–(*ijk*) is the offending head because the three touch detectors associated with it have latched up. After this determination is made a manual switch could be energized to temporarily cause the manual reset signal at terminal 68 to go to a low level. This would cause AND gates 67 and 62 to return to their normal low level and the touch detector circuit would return to its normal state.

It should be noted that modifications could be made to the above described specific embodiment without departing from the spirit of the invention. However, the embodiment shown in the drawings is a preferred embodiment because of the small number of diodes required in the coupling matrix. In a further embodiment, by way of example, coupling matrix 11 could be organized according to a binary classification system. In that event with only 16 touch detector circuits the system could uniquely identify which one of the 196 was the offending head. In this modification fewer touch detector circuits are used but a larger number of diodes are required. Each of the 196 wires coupling block 10 to coupling matrix 11 would connect to a diode gate consisting of eight diodes. The anodes of these diodes would distribute the signals generated at a probe to eight of the 16 touch detector circuits. For purposes of describing the coupling matrix, consider each probe as an 8 bit binary number. For example, consider the first probe as the binary number 00000001, the 170th probe as the number 10101010, and the 196th probe as the number 11000100. Consider each of the 16 touch detector circuits as an ordered pair of numbers. The first number of the ordered pair identifies which one of the eight bit locations of a binary number with which the touch detector is associated and the second number of the ordered pair identifies which of the two binary values with which it is associated. As examples, the first touch detector could be considered as (1, 0), the second as (1, 1), the third as (2,0) and so forth. The 16th touch detector would be considered as (8, 1). The first touch detector would be connected to the anode of one of the eight diodes in every diode gate coupled to a probe which has a binary value of 0 in its first bit location (the least significant bit). The second touch detector would be connected to one of the eight diodes in every diode gate coupled to a probe which has the binary value of 1 in its first bit location.

Consider again the first probe (00000001). This probe would connect to the common node of an eight-diode gate. The anodes of the eight diodes would couple respectively to touch detectors (1, 1), (2, 0), (3, 0), (4, 0), (5, 0), (6, 0), (7, 0), and (8, 0).

By means of this organization of the coupling matrix 11 if any one of the 196 probes makes electrical contact with the disk a unique subset of eight from the set of 16 touch detector circuits will respond to generate coded signals uniquely identifying the offending head.

What is claimed is:

1. A storage system comprising:

a magnetic record member having an electrically conductive surface and having a plurality of storage tracks;

a first plurality of transducer head assemblies for reading and writing on the tracks of the record member, each head assembly having an electrically conductive probe normally separated from the magnetic record member by a dielectric gap;

a second, smaller plurality of touch detector circuits for generating signals which indicate that electrical contact has occurred between an offending probe and the record member; and means for coupling the touch detector circuits to the probes such that each touch detector circuit is coupled to all probes in one subset of a plurality of exhaustive, at least partially disjoint subsets of the plurality of probes and each probe is coupled to at least one detector, and at least one probe is coupled to more than one detector so that the signals produced by the touch detector circuits define a code which uniquely identifies the offending probe which has made contact with the record member.

2. The storage system according to claim 1 in which the plurality of probes are arranged into a plurality of mutually exclusive, exhaustive subsets, each such subset comprising at least one probe, the plurality of touch detectors comprising two groups, one group of touch detectors identifies the subset containing the offending probe, and a second group of touch detectors identifies the offending probe within the zone.

3. The storage system according to claim 1 in which the means for coupling comprise a plurality of groups of diodes, one end of each diode within a group being coupled to a probe and the other end of each diode within a group being coupled to a different touch detector circuit from the other diodes within its group and thereby defining a signal distribution branch.

4. The storage system according to claim 1 in which each touch detector circuit comprises:
a bias circuit for establishing a potential across the dielectric gap between the record member and the probes coupled to the touch detector circuit, the potential changing a predetermined amount whenever an electrical contact occurs between the probe and the disk; and
a differential input comparator circuit for generating a signal indicating that an electrical contact has occurred between a probe and the record surface in response to the predetermined change in potential between the probe and the record surface.

5. The storage system according to claim 1 further comprising means for latching up the touch detector circuits identifying the offending probe so that they continue to identify the offending probe after electrical contact between the offending probe and the record member ceases.

6. The storage system of claim 1 wherein each touch detector circuit includes a feedback loop comprising means responsive to the coincidence of the indicating signal produced by the touch detector circuit and a control signal for latching up the touch detector circuit; and the system further comprising delaying means for producing said control signal after any one of the touch detector circuits generates an indicating signal for a predetermined interval of time.

7. A storage system comprising:
a magnetic record member having an electrically conductive surface and having a plurality of storage tracks, the tracks being grouped into zones;
a transducer head assembly for reading and writing on each of said tracks, said head assemblies each having an electrically conductive probe normally separated from the magnetic record member by a dielectric gap, each probe being associated with a zone and a track within said zone;
a first plurality of touch detector circuits, at least one of which is actuated in response to an electrical contact between one of said probes and said record member for indicating the zone in which the probe has made contact;
a second plurality of touch detector circuits, at least one of which is actuated in response to an electrical contact between one of said probes and said record member for indicating the track within the zone with which the probe has made contact;
means for coupling each of said first plurality of touch detector circuits to all of said probes associated with one of said zones;
means for coupling each of said second plurality of touch detector circuits to one of said probes in each of said zones.

8. The storage system according to claim 7 wherein the touch detector circuits comprise:
means for establishing a potential across the gap between the probe and record member during normal operation; and
a differential input comparator circuit responsive to a predetermined change in the potential difference across the gap for generating a signal which indicates that an electrical contact has occurred therebetween.

9. The storage system according to claim 8 additionally comprising:
means responsive to the signals produced by the touch detector circuits for generating an alarm signal when any probe has made contact with said record member.

10. The storage system according to claim 7 further comprising means for latching up the touch detector circuits indicating the zone and the track within the zone in which the probe has made contact so that they continue to so indicate after electrical contact between the probe and the record member ceases.

11. The storage system of claim 7 wherein each touch detector circuit comprises a differential input comparator circuit having an output terminal on which is generated an indication signal, and a feedback loop comprising means responsive to the coincidence of a control signal and the indication signal for latching up the touch detector circuit; and the system further comprising delaying means for producing said control signal after any one of the comparator circuits generates an indication signal for a predetermined interval of time.

12. A storage system comprising:
a rotatable magnetic record member having an electrically conductive surface defining a plurality of concentric annular zones, each zone containing a plurality of tracks for storing information;
a plurality of assemblies constructed for floating on a thin film of air adjacent to the record member, each assembly having an electrically conductive probe and supporting a magnetic transducer in proximity with one of the tracks within a zone on the disk;
a plurality of bias circuits for establishing a potential across the dielectric gap between each said probe and said record member, said potential changing a predetermined amount providing a predetermined signal in the event that an electrical contact occurs between one of said probes and said record member;
a plurality of differential input comparator circuits responsive to said predetermined signal for generating a signal indicating that an electrical contact has occurred between one of said probes and said record member, a first subset of said plurality of comparators indicating the zone and a second subset thereof indicating the track within the zone in which the probe is located; and
a plurality of groups of diodes for coupling each probe to one of said first subset of comparators and to one of said second subset of comparators, one end of each diode within a group being coupled to a common node and coupled to a probe thereby defining a branch for distributing the signals developed at the probe to the comparators.

13. The storage system according to claim 11 comprising in addition:
means responsive to all of the signals produced by the comparators for producing a warning signal when any probe makes contact with said record member.

14. The storage system according to claim 13 in which the means for producing a warning signal comprises at least one OR gate and a delay circuit for producing a warning signal after a touch indicator has produced a signal for a time long enough to discriminate against noise pulses.

15. The storage system according to claim 12 further comprising means for latching up the comparators indicating the zone and track within the zone in which the probe is located so that they continue to so indicate after electrical contact between the probe and the record member ceases.

16. A storage system comprising:
a plurality of magnetic recording surfaces each having a plurality of tracks arranged into annular zones, each zone comprising a plurality of tracks, transducer head assemblies for reading on said tracks, a plurality of head assemblies being provided for each of said zones, each of said head assemblies comprising a probe normally separated from the corresponding recording surface by a dielectric gap, a plurality of touch detector circuits less in number than the number of said plurality of head assemblies, a separate group of said touch detector circuits being associated respectively with said recording surfaces and with said zones and with the head assemblies associated with one of said zones, said touch detector circuits generating a signal indicative of an electrical contact between an offending probe and one of said record members, means for coupling each one of said groupings of touch detector circuits to the probes of said head assemblies, the coupling means coupling the probes of said head assemblies in exhaustive, partially disjoint subset grouping of said head assemblies to each one of said groups of touch detector circuits, thereby causing at least one touch detector circuit to be actuated in each group of touch detector circuits to indicate the recording surface, the zone and the head assembly within such zone, for an offending head assembly probe.

17. A storage system according to claim 16 wherein said coupling means comprises a set of unilaterally conductive devices for each of said probes, each of said sets comprising a unilaterally conductive device for a recording surface, for a zone and for a head assembly, the unilaterally conductive devices within each set being coupled at one side to the corresponding probe, each unilaterally conductive device within a set being individually coupled at the opposite side thereof to the respective groups of surface, zone and head assembly detector circuits.

18. A storage system according to claim 17 wherein there are the same number of zones for each face and the same number of head assemblies for each zone and wherein there is a touch detector circuit for each of said faces and a touch detector for each of said zones on one face and a touch detector for each of said head assemblies in one zone, the unilaterally conductive device within each of said sets being coupled to one touch detector circuit within the corresponding group of surface, face and head assembly touch detector circuits.

19. The storage system according to claim 16 further comprising means for latching up the touch detector circuits generating the signals indicative of an electrical contact so that such touch detector circuits continue to generate such signals after electrical contact between the offending probe and the record member ceases.

20. The storage system according to claim 16 wherein each touch detector circuit comprises a differential input comparator circuit having an output terminal on which is generated an indication signal, and a feedback loop comprising means responsive to the coincidence of a control signal and said indication signal for latching up the touch detector circuit; and the system further comprising means for producing said control signal after any one of the comparator circuits generates an indication signal for a predetermined interval of time.

21. A storage system comprising:

a magnetic recording surface having a plurality of tracks arranged into annular zones, each zone comprising a plurality of tracks, transducer head assemblies for reading on said tracks, a plurality of head assemblies being provided for each of said zones, each of said head assemblies comprising a probe normally separated from the recording surface by a dielectric gap, a plurality of touch detector circuits less in number than the number of said plurality of head assemblies, a separate group of said touch detector circuits being associated respectively with said zones and with the head assemblies associated with one of said zones, said touch detector circuits generating a signal indicative of an electrical contact between an offending probe and said record member, means for coupling each one of said groupings of touch detector circuits to the probes of said head assemblies, the coupling means coupling the probes of said head assemblies in exhaustive, partially disjoint subset groupings of said head assemblies to each one of said groups of touch detector circuits, thereby causing at least one touch detector circuit to be actuated in each group of touch detector circuits to indicate the zone and the head assembly within such zone, for an offending head assembly probe.

22. A storage system according to claim 21 wherein said coupling means comprises a set of unilaterally conductive devices for each of said probes, each of said sets comprising a unilaterally conductive device for a zone and for a head assembly, the unilaterally conductive devices within each set being coupled at one side to the corresponding probe, each unilaterally conductive device within a set being individually coupled at the opposite side thereof to respective groups of zone and head assembly touch detector circuits.

23. The storage system according to claim 21 further comprising means for latching up the touch detector circuits generating the signals indicative of an electrical contact so that such touch detector circuits continue to generate such signals after electrical contact between the offending probe and the record member ceases.

24. The storage system according to claim 21 wherein each touch detector circuit comprises a differential input comparator circuit having an output terminal on which is generated an indication signal, and a feedback loop comprising means responsive to the coincidence of a control signal and said indication signal for latching up the touch detector circuit; and the system further comprising means for producing said control signal after any one of the comparator circuits generates an indication signal for a predetermined interval of time.

* * * * *

PO-1050
(5/69)

UNITED STATES PATENT OFFICE
CERTIFICATE OF CORRECTION

Patent No. 3,654,628 Dated April 4, 1972

Inventor(s) Donald M. Goodale

It is certified that error appears in the above-identified patent and that said Letters Patent are hereby corrected as shown below:

IN THE SPECIFICATION:

Column 3, line 33, change "couplings" to --coupling--
4, line 13, after "10-(1,1,1" add --)--
line 23, before "i.e. 18-1" insert -- ( --.

IN THE CLAIMS:

Column 8, line 47, "claim 11" should be --claim 12--

Signed and sealed this 22nd day of August 1972.

(SEAL)
Attest:

EDWARD M.FLETCHER,JR.
Attesting Officer

ROBERT GOTTSCHALK
Commissioner of Patents